US007365866B2

(12) United States Patent
Takamiya

(10) Patent No.: US 7,365,866 B2
(45) Date of Patent: Apr. 29, 2008

(54) IMAGE PROCESSING APPARATUS, IMAGE PROCESSING METHOD, MEDIUM THAT STORES CONTROL PROGRAM FOR REALIZING THE METHOD

(75) Inventor: Hiroyoshi Takamiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1011 days.

(21) Appl. No.: 10/421,144

(22) Filed: Apr. 23, 2003

(65) Prior Publication Data

US 2003/0197884 A1    Oct. 23, 2003

(30) Foreign Application Priority Data

Apr. 23, 2002    (JP) .............................. 2002-120662

(51) Int. Cl.
*G06F 15/00* (2006.01)
(52) U.S. Cl. ................... 358/1.13; 358/1.15; 358/1.18; 358/1.2; 715/234
(58) Field of Classification Search ............... 358/1.13, 358/1.15, 1.18, 1.2; 715/234
See application file for complete search history.

(56) References Cited

U.S. PATENT DOCUMENTS

| 6,278,449 | B1 * | 8/2001 | Sugiarto et al. ............ 715/826 |
| 6,362,894 | B1 * | 3/2002 | Shima ........................ 358/1.15 |
| 6,553,393 | B1 * | 4/2003 | Eilbott et al. ............... 715/513 |
| 7,050,192 | B2 * | 5/2006 | Shima ........................ 358/1.18 |
| 2002/0030849 | A1 * | 3/2002 | Takamiya .................. 358/1.15 |
| 2003/0030841 | A1 * | 2/2003 | Parry ......................... 358/1.15 |
| 2006/0075070 | A1 * | 4/2006 | Merissert-Coffinieres et al. ......... 709/218 |

FOREIGN PATENT DOCUMENTS

| JP | 02-015375 | 1/1990 |
| JP | 07-271531 | 10/1995 |
| JP | 10-250029 | 9/1998 |
| JP | 11-191082 | 7/1999 |
| JP | 11-203100 | 7/1999 |
| JP | 2001-014211 | 1/2001 |
| JP | 2001-147877 | 5/2001 |

OTHER PUBLICATIONS

Y. Nagai, "In-Depth Comparison", PC Fan, No. 125, Jul. 1, 2000, Mainichi Communications, p. 202, Review on WebBooster Ninja2000 (See the foregoing partial translation).
H. Kimura,, "Latest Photo Album Software Introduction", Complete Use of Digital Camera Photo, Al Mook, No. 262, p. 130, Review on Kuraemon Version 7, Oct. 1, 2000, Al Publishing (see the foregoing partial translation).

* cited by examiner

*Primary Examiner*—Twyler Lamb
*Assistant Examiner*—Mark R. Milia
(74) *Attorney, Agent, or Firm*—Fitzpatrick, Cella, Harper & Scinto

(57) ABSTRACT

An image processing apparatus that performs an output processing based on document data including a command to refer to an external resource is disclosed. The image processing apparatus includes an output data processing unit that reads document data from a storage device and performs an output data processing, an analysis unit that analyzes the document data, an external resource obtaining unit that performs a processing to obtain an external resource through a network according to an analysis result of the analysis unit, and a print processing setting unit that is capable of making a setting not to output external resources. When the print processing setting unit makes a setting not to output external resources, the output data processing unit analyzes the document data inputted and generates output data without using the external resources.

13 Claims, 14 Drawing Sheets

Fig. 4

| ID | URI | Time stamp | Reference Frequency Counter |
|---|---|---|---|
| 1 | http://www.xxxx.co.jp/.../ | 2000/06/01 10:00:00 | 5 |
| 2 | http://www.w3c.org/.../ | 2000/06/12 12:30:15 | 3 |
| ... | ... | ... | ... |

Fig. 8

(a)
```
<title>
_____
</title>
<date>
_____
</date>
<author>
_____
</author>
```

(b)
```
<image>
_____
_____
_____
_____
_____
</image>
```

(b) Title (a) Mix

Fig. 14

[Example of commands]

```
<rect x="..." y="..." width="..." height="..." style="..."/>      ··· 140
<image xlink:href="http://www.w3.org/..."x="..." y="..."/>   ···141
<text x="..." y="...">
       This is TEXT.
</text>                       ···142
```

IMAGE PROCESSING APPARATUS, IMAGE PROCESSING METHOD, MEDIUM THAT STORES CONTROL PROGRAM FOR REALIZING THE METHOD

BACKGROUND OF THE INVENTION

1. Field of the Invention

The present invention relates to image processing systems including copy machines, facsimiles, printers and combined equipments of the aforementioned equipments.

2. Related Background Art

In recent years, a variety of digital copy machines have become popular, and systems have been developed in which a variety of interface devices are connected to a digital copy machine such that a host computer can output image data through the digital copy machine. Also, print data that includes commands to obtain external resources are being developed.

However, when data for a document that contain commands to refer to external resources are processed, processings to output external resource data could not be readily and flexibly performed in many occasions. For example, when an external resource that the document refers to cannot be outputted, an attempt to obtain the external resource fails, or the image format of the external resource downloaded is not supported, the image processing apparatus cannot output the external resource.

SUMMARY OF THE INVENTION

The present invention has been made in view of the above problems. In accordance with an embodiment of the present invention, when a printing processing for external resources is to be conducted, a system can limit operations to obtain specified ones of the external resources that are already known to be unnecessary. In one aspect, the system can set a printing processing for specified ones of the external resources to be unnecessary. In this instance, the system can limit operations to obtain the specified ones of the external resources that are set to be unnecessary to obtain.

In another aspect, the present invention relates to a system that prevents an external resource from being obtained again when a previous attempt to obtain the external resource has failed, such that occurrence of wasteful network traffic can be suppressed, and output processings at higher speeds can be achieved.

In still another aspect, the present invention relates to a system that judges as to whether or not the format of an external resource can be processed by an image processing apparatus, and performs output processings without using the external resource when the format cannot be processed, such that at least information contained in document data can be securely outputted.

Furthermore, in another aspect, the present invention relates to a system that allows an image processing apparatus that processes documents containing commands to refer to external resources to place on a screen information concerning the external resources based on a user's indication and to print the information even when an output data processing for the external resources could not be executed, such that the information for the external resources can be recorded on a print medium, and thus the value of such information as documents can be retained.

In accordance with an embodiment of the present invention, an image processing apparatus that performs an output processing based on document data containing commands to refer to external resources is provided. The image processing apparatus includes an output data processing section that reads document data from a specified storage section and performs an output data processing, an analysis section that analyzes the document data, an external resource obtaining section that performs a processing to obtain external resources through a network according to an analysis result of the analysis section, and a print processing setting section that can make a setting not to output external resources. When a setting not to print out external resources is set at the print processing setting section, the output data processing section analyzes the document data inputted and generates output data without using the external resources.

In accordance with another embodiment of the present invention, an image processing apparatus performs an output processing based on document data containing commands to refer to external resources. The image processing apparatus includes an output data processing section that reads document data from a specified storage section and performs an output data processing, an analysis section that analyzes the document data, an external resource obtaining section that performs a processing to obtain external resources through a network based on an analysis result of the analysis section, and a transmission section that, when the external resource obtaining section fails to obtain the external resources, transmits from the external resource obtaining section to the output data processing section information indicating that the external resource obtaining section has failed to obtain the external resources. When the transmission section transmits to the output data processing section information indicating that the external resource obtaining section has failed to obtain the external resources, the output data processing section analyzes the document data inputted and generates output data without using the external resources.

In accordance with still another embodiment of the present invention, an image processing apparatus performs an output data processing based on document data obtained through a network. The image processing apparatus includes an input section that inputs document data from a computer, an output data processing section that analyzes the document data inputted and performs an output data processing, an external resource obtaining section that analyzes the document data inputted and performs a processing to obtain external resources, and a judging section that judges as to whether a format of the external resources obtained by the external resource obtaining section is printable in the image processing apparatus. When the judging section determines that the external resources are not printable by the image processing apparatus, the output data processing section analyzes the document data inputted and generates output data without using the external resources.

Another aspect of the present invention is to provide each of apparatuses with a common output data processing module to solve the problems that may occur when data including external resource data are outputted.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 4 shows an example of a resource management table that is stored in a memory of the image processing apparatus shown in FIG. 3.

FIG. 8 shows an example of an external resource with meta data.

FIG. 14 shows an example of command lines included in document data.

DESCRIPTION OF THE PREFERRED EMBODIMENTS

Embodiment 1

Figure 1:
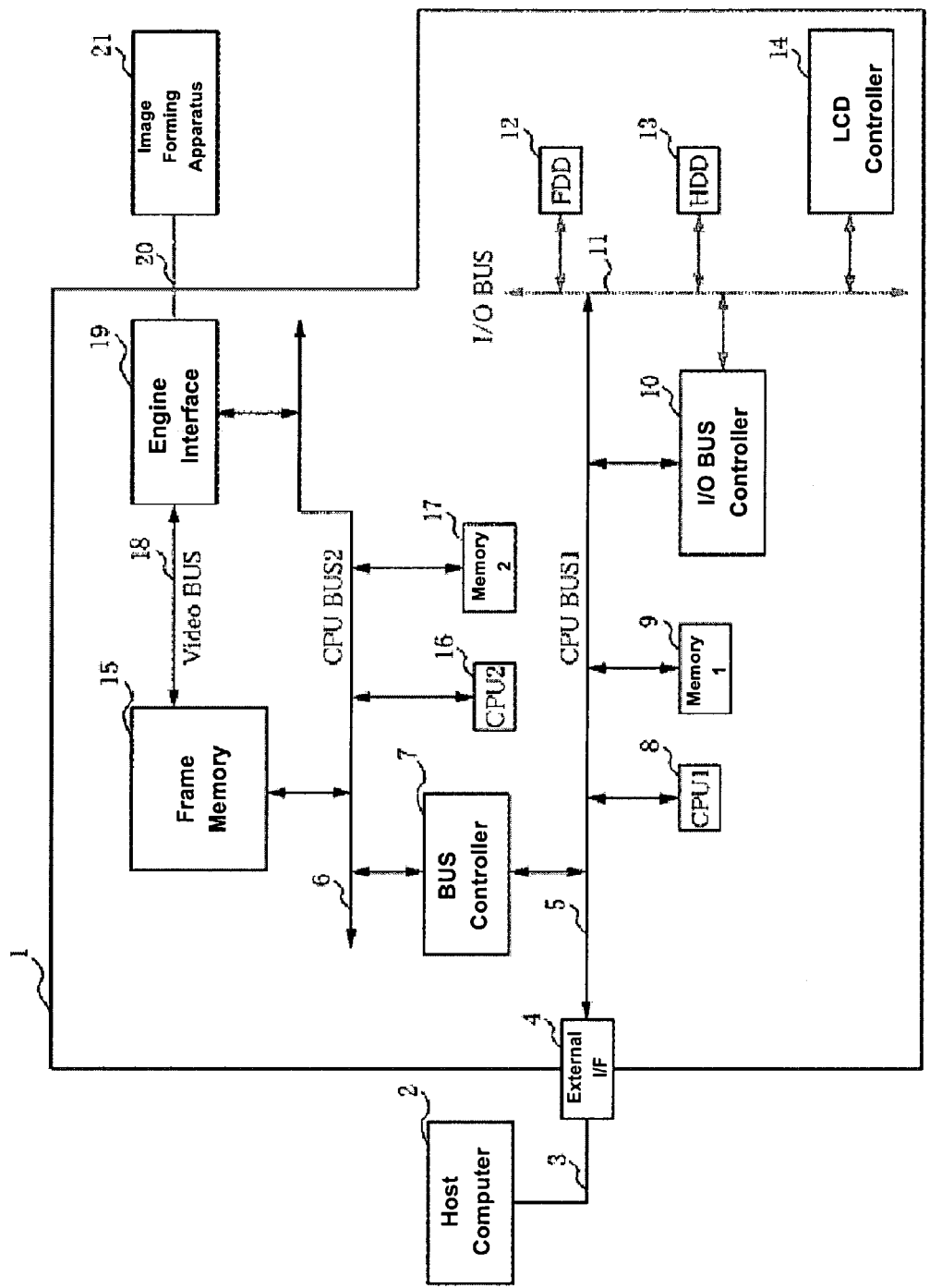
FIG. 1 shows a diagram of an example of an image processing apparatus.

FIG. 1 shows a controller, which is an example of an image processing apparatus in accordance with one embodiment of the present invention. The image processing apparatus of the present embodiment performs image processings including a processing to analyze document data to be described below. Examples of the image processing apparatus may include a controller that may be built in a printing apparatus such as a printer or a copier that is provided with a printing unit in one piece, or a controller that may be built in a standard computer that is provided independently of a printing unit. FIG. 1 shows an internal structure of a controller 1, which is an example of the image processing apparatus, in accordance with one embodiment of the present invention. The image processing apparatus 1 shown in FIG. 1 is connected to a printer controller 2, which is a host computer in this example, by an interface cable 3 through an external I/F 4. An image forming apparatus 21 is connected to the image processing apparatus 1 by an interface cable 20 through an engine interface 19. In the illustrated embodiment, the image forming apparatus 21 that has a printing function is externally connected to the image processing apparatus 1. However, the image forming apparatus 21 may be internally provided within the image processing apparatus 1.

A first CPU 8 controls I/O for externally connected devices other than the image forming apparatus 21. A first CPU bus 5 is connected to the external I/F 4 that serves as an interface with the host computer 2, a program memory 9, and an I/O bus controller 10 that controls an I/O bus 11. For example, document data that may have commands to refer to external resources represented by, for example, XML, is inputted from the host computer 2 through the external I/F 4 to the engine interface 19. A bus controller 7 is also connected to the first CPU bus 5 such that a second CPU bus 6 of a second CPU 16 can be coupled to the first CPU bus 5. The second CPU 16 will be described below. The I/O bus controller 10 controls a general purpose I/O for a floppy® disk drive 12, a hard disk drive 13, an LCD controller 14, an operation section not shown or the like that are connected to the I/O bus 11.

The second CPU 16 controls the image forming apparatus 21 connected thereto, and also develops image data that is stored in a frame memory 15. A second memory 17 is a program memory. When the power is turned on, a control program is loaded from the hard disk drive 13 onto the second memory 17 through the bus controller 7. Also, the memory 17 is used for communications with the first CPU 8. The engine interface 19 is connected to the second CPU bus 6, and performs a variety of settings to thereby control the image forming apparatus 21. A video bus 18 is a bus exclusively used for images. Image data that is developed by the second CPU 16 and stored in the frame memory 15 is transferred to the engine interface 19 through the video bus 18, and further transferred to the image forming apparatus 21.

Figure 2:
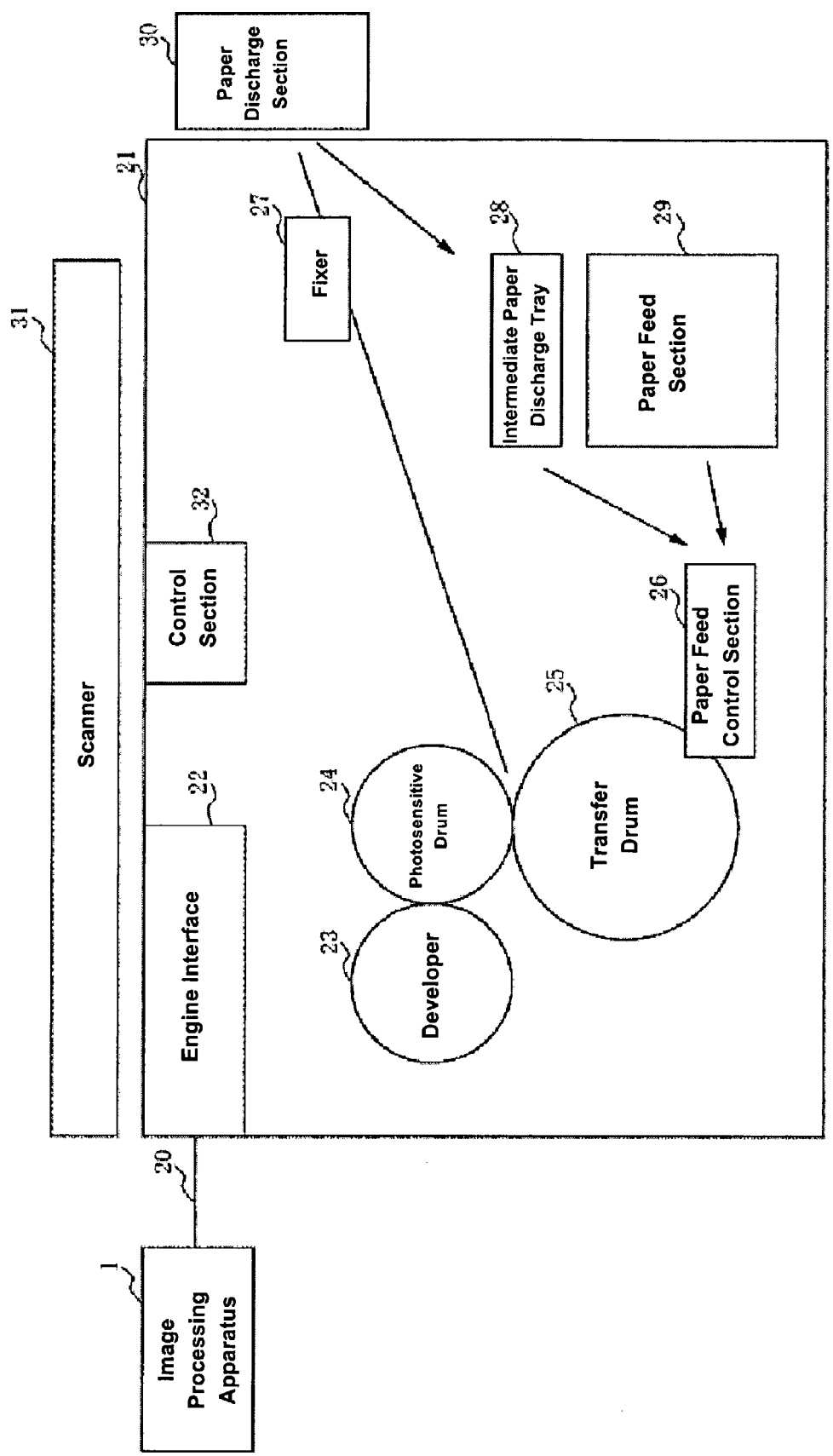
FIG. 2 shows an example of an image forming apparatus that is connected to the image processing apparatus shown in FIG. 1.

FIG. 2 shows an example of the image forming apparatus 21 that is connected to the image processing apparatus indicated in FIG. 1. The image forming apparatus 21 has an engine interface 22 that is connected to the image processing apparatus 1 through an interface cable 20. Image data is sent from the image processing apparatus 1, converted into a latent image on a photosensitive drum 24, and an image representing the image data is formed by a developing device 23. In response to an instruction from the image processing apparatus 1, a paper feed control section 26 feeds printing medium such as print paper from a paper feed section 29 or an intermediate paper discharge tray 28, and mounts the print paper on a transfer drum 25. Then, the image formed on the photosensitive drum 24 is transferred onto the print paper mounted on the transfer drum 25, and the image is fixed on the print paper by a fixer 27. When the image is fixed, the paper may be discharged to a paper discharge section 30 or stored in the intermediate paper discharge tray 28 according to an instruction of the image processing apparatus 1. When image data is scanned and read by a scanner 31, the image data is processed by a control section 32, and printed in a similar manner as the image data sent from the image processing apparatus 1.

Figure 3:
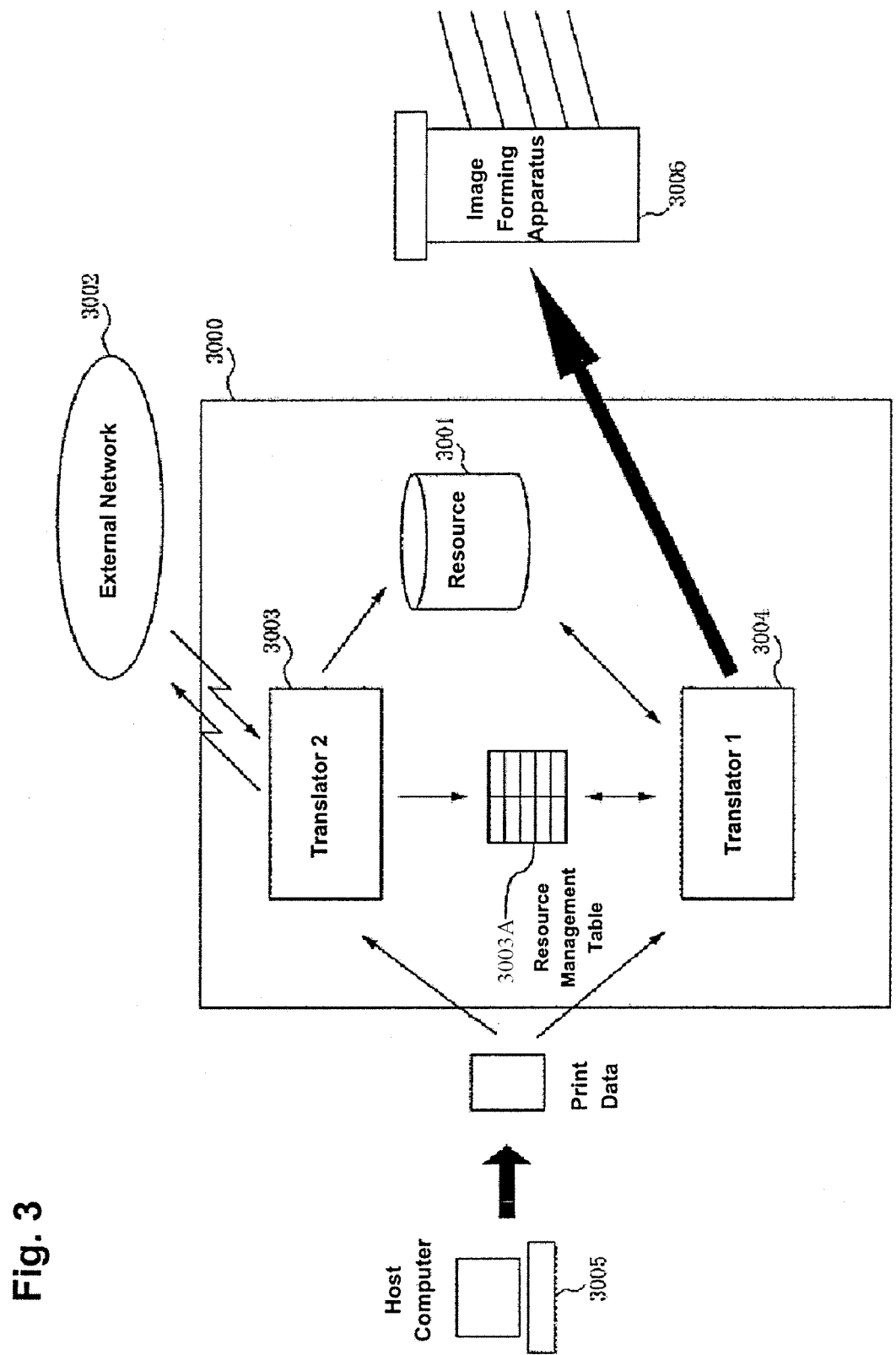
FIG. 3 shows an example of an image processing apparatus in accordance with an embodiment of the present invention.

FIG. 14 shows an example of command lines included in the document data. Next, processings for prefetching external resources with a translator 2 (3003), which is an output data processing unit in accordance with a preferred example of the present invention, will be described with reference to FIGS. 3 and 14. FIG. 3 shows an example of the image processing apparatus in accordance with an embodiment of the present invention. It is noted that, in the present embodiment, the external resources mean data that are referred to in print commands, which may be external data that are obtained through a network. For example, the external resources may be any of data with which image data can be formed by specified processings, such as, for example, image files in JPEG format or the like, data that are described in a page description language that is represented by Postscript language, data that are described in vector graphic language such as Scalable Vector Graphic (SVG), objects of business utility applications or the like. Also, even when an external resource is a moving picture file, a graphic board or the like can be used to capture a still frame picture from the moving picture file, such that still frame picture data can be obtained. The still frame picture data can be mixed with document data to form image data. Accordingly, external resources include moving picture data. Also, meta data, for example, can be listed as information concerning external resources. Document data that is to be inputted in the image processing apparatus 1 may be read from a predetermined storage unit. The command lines shown in FIG. 14 are examples of a figure drawing command 140, an external resource obtaining command 141, and a character drawing command 142 described in Extensible Markup Language (XML). Meta data is data for describing data. For example, when an external resource is JPEG image data, its meta data may be information indicating the date when the image file was created, the author, the title, and the location of the external resource data. For example, commands to refer to external resources and metal data can be embedded in document data that is described in XML. Furthermore, document data may also contain information other than those described by meta data, for example, file names of external resources, objects' names, author, date of creation, date of correction and the like that are managed by a predetermined network transfer protocol (for example, File Transfer Protocol, Hyper Text Transfer Protocol (FTP), Internet Printing Protocol (IPP) or the like).

Document data inputted from the host computer 3005 shown in FIG. 3 is processed by the translator 1 3004 and the translator 2 3003. The host computer 3005 may be a standard PC or a work station. Also, the following method may be conducted instead of directly inputting document data from the host computer that instructs printing to the image processing apparatus 3000. The location of the document data on the network, for example, a URI (uniform resource identifier) (which is described in detail in RFC2396) is inputted in the image processing apparatus 3000, the image processing apparatus 3000 transmits the URI to a Web server that retains document data corresponding to the URI. Then, the Web server retrieves the document data corresponding to the URI, and transmits the document data to the image processing apparatus 3000. Upon receiving the document data, the image processing apparatus 3000 performs processings to print the document data. In this manner, a so-called reference-and-printing method may be adopted as a method for inputting documents. A browser may be used to input the URI. For example, when a Web server receives the URI, and completes its transmission of document data to an image forming apparatus, it would be convenient if the Web server that has received the URI returns HTML or XML data notifying that the document data is being printed by the image forming apparatus.

Here, the translator 1 initially receives and analyzes a print command, and performs an imaging processing. The translator 2 processes a command to refer to external resources which is included in print data indicated in FIG. 14, for example. The translator 2, which is a preferred example of a transmission unit, accesses an external network 3002 when the print data includes a command to refer to external resources, retrieves the external resources and stores them in a storage device 3001, allocates IDs to the retrieved external resources, and records in a resource management table 3003 A location information of the external resources and the time when the external resources are retrieved. The translator 1 successively processes commands. When a command to refer to external resources appears, the translator 1 refers to the resource management table, uses the resources if they are already stored in the storage device, and updates a reference frequency counter and then performs an analysis processing and a printing processing of the meta data. If the resources have not yet been retrieved, the translator 1 waits until the external resources are retrieved. The processed meta data and image data are sent to the image forming apparatus 3006 to be printed. Although not shown in the drawings, the translator 2 checks the reference frequency counter recorded in the resource management table at set time intervals, or when an update of the resource management table is requested, delete any records whose reference frequency is lower than a specified reference frequency value, and automatically updates records whose reference frequency is greater than a specified reference frequency value. The reference frequency values that are used for judging as to whether records are to be deleted or automatically updated may be the same or different from each other.

FIG. 4 shows an example of the resource management table stored in a memory of the image processing apparatus shown in FIG. 3. In order to access external resources retrieved onto the storage device 3001, the resource management table manages the external resources in a table format by allocating unique IDs to the external resources retrieved. Also, the resource management table retains URIs of the retrieved external resources as location information of the external resources. Further, the resource management table records reference frequencies that are used to mange deletion and update of the corresponding resources, and data format information that indicate whether the external resources are in printable format. In the present embodiment, the data format information may be in Format Flag indicative of whether or not the resources are printable. The data format information may be managed by names of the data formats, or identifiers associated with the data formats. Also, the types of printable data formats may be changed. In this case, the data format information recorded in the resource management table at the time of the change is changed to be in consistent with the change.

When print data includes commands to refer to external resources, the commands may be retrieved from the print data, and an external resource obtaining processing and a print data conversion processing may be performed in parallel. This parallel processing can speed up the processings of the print data.

Figure 5:
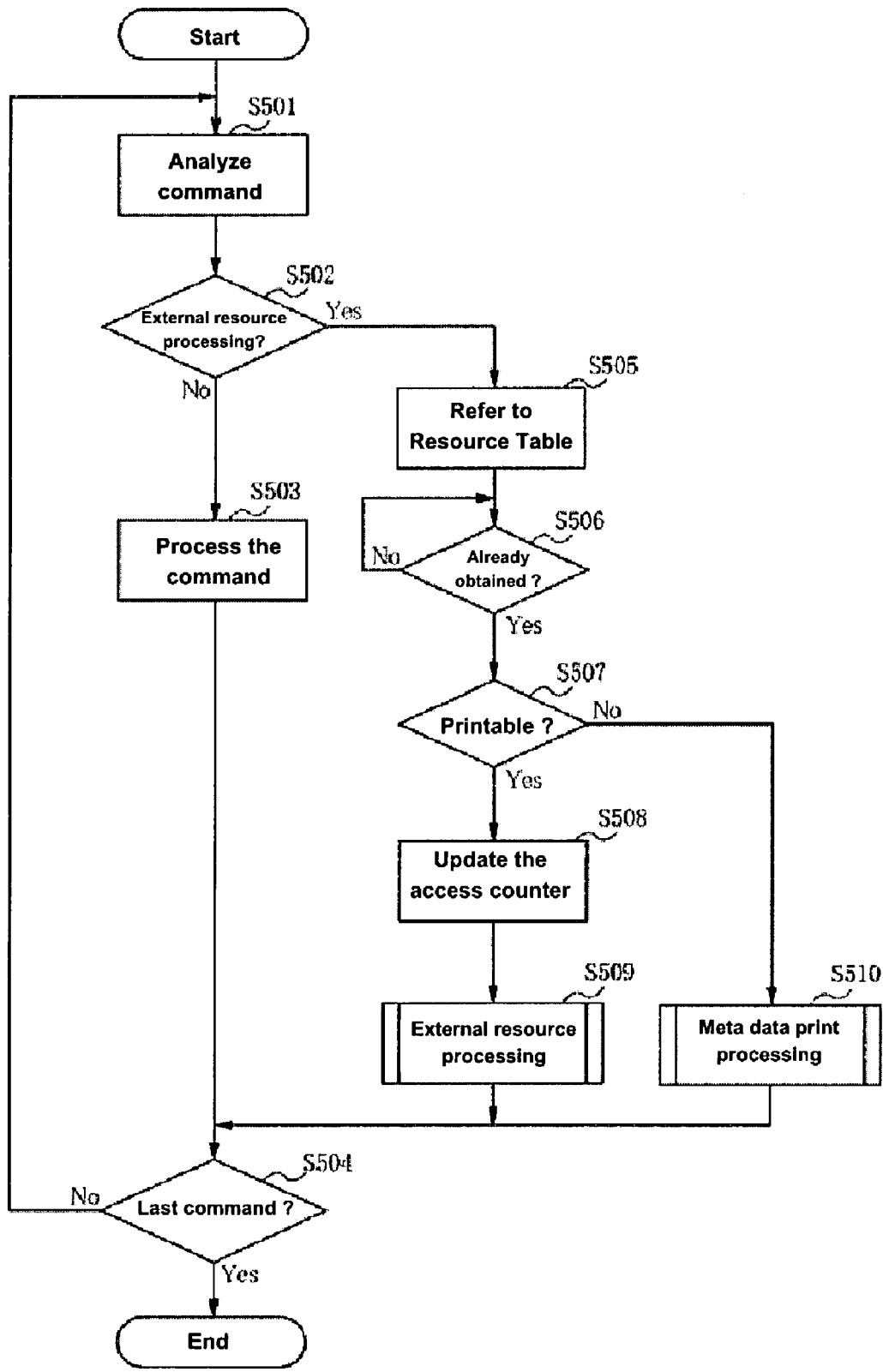
FIG. 5 shows an image processing by a translator 1.
Figure 6:
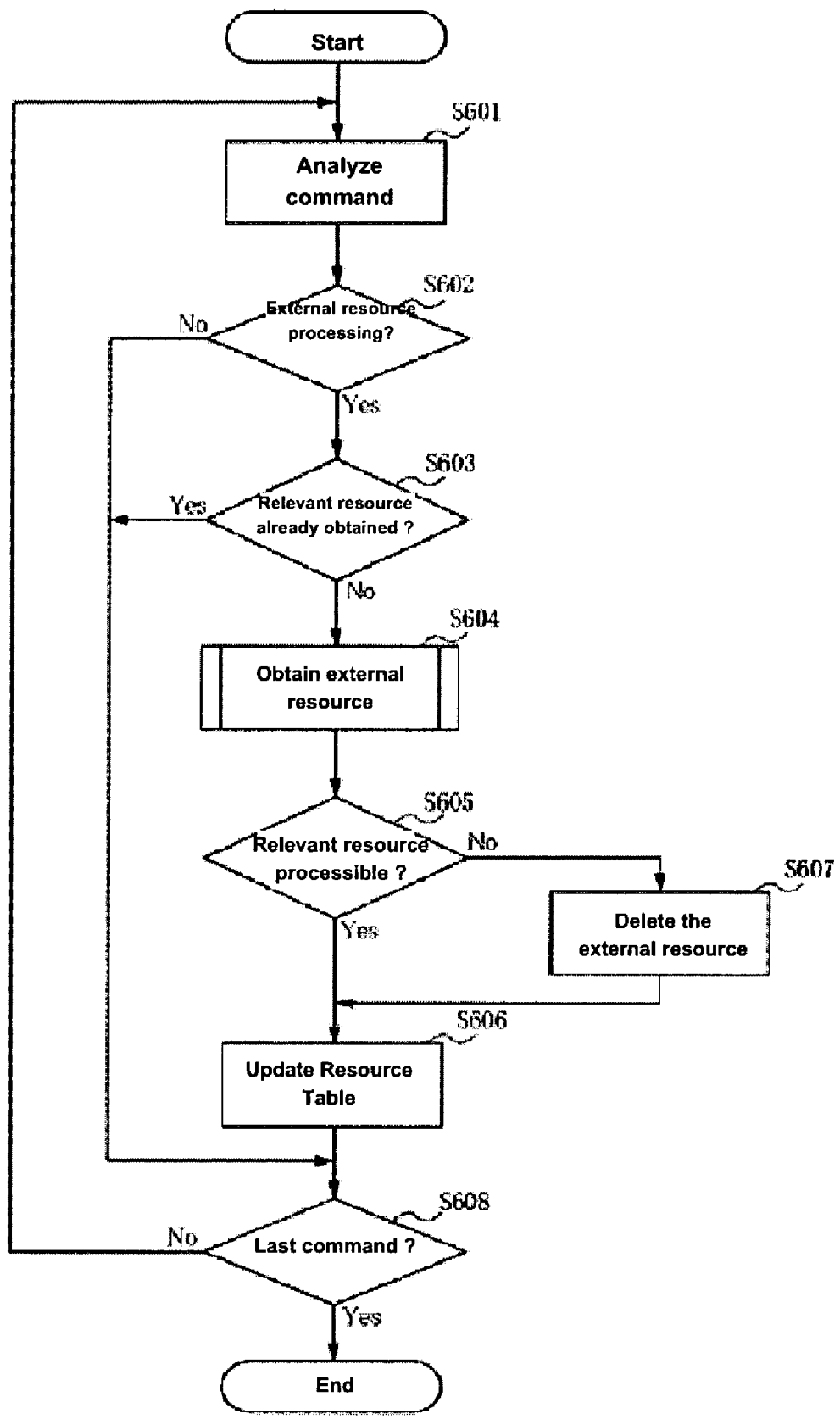
FIG. 6 shows an image processing by a translator 2.
Figure 7:
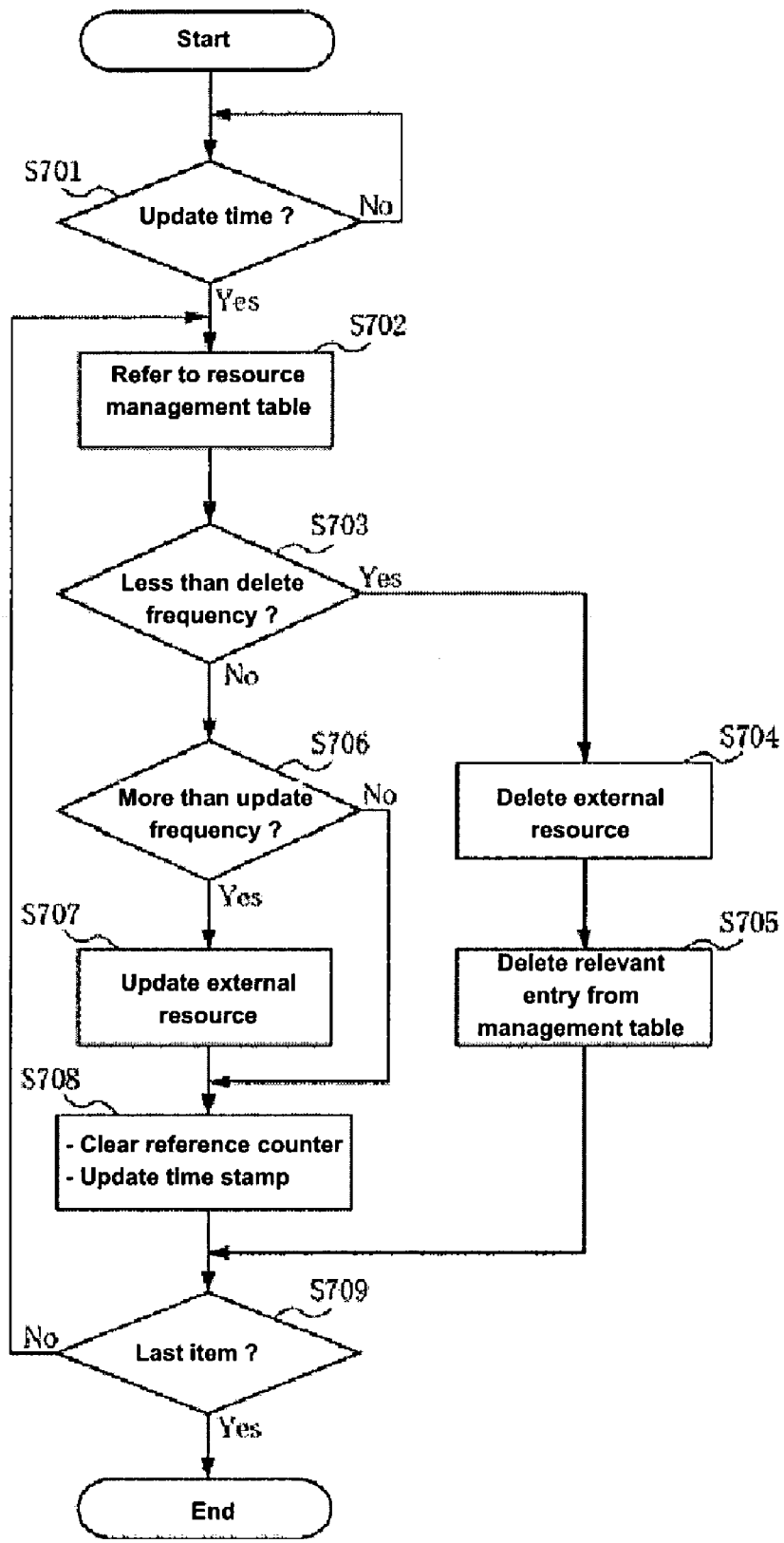
FIG. 7 shows an example of a renewal processing for external resources that have already been obtained.

Process flows of the respective translators are described with reference to FIG. 5, FIG. 6 and FIG. 7. FIG. 5 shows an example of an image processing by the translator 1, FIG. 6 shows an example of an image processing by the translator 2, and FIG. 7 shows an example of an update processing for external resources that have been already obtained. Referring to FIG. 5, the translator 1 analyzes a command (or one of a plurality of commands) in inputted print data in step S501, and checks in step S502 if the command is a command to refer to external resources. When the command is not a command to refer to external resources, the translator 1 performs processings of the command in step S503, and checks in step S504 if the command is the last command. If it is not the last command, the process returns to step S501 and the next command is analyzed. When it is the final command, the processing is completed. If, in step S502, the command is found to be a command to refer to external resources, the resource management table is referred to in step S505. If the requested external resources have not been obtained, the process waits until the requested external resources are obtained in step S506. When the requested external resources have already been obtained, whether or not the resources are printable is checked in step S507. When they are determined to be printable, the access frequency counter of the resource management table is updated in step S508, an external resource reference processing is performed in step S509, and then whether the command is the last command is checked in step S504. If it is found in step S507 that the resources are not in a printable format, a meta data print processing is performed in step S510, and whether the command is the last command is checked in step S504. When the command is found to be the last command, the translator 1 completes the image processing.

Next, an image processing by the translator 2 in FIG. 6 is described. In FIG. 6, the translator 2 analyzes a command (or one of a plurality of commands) in inputted print data in step S601, and checks in step S602 if the command is a command to refer to external resources. When the command is not a command to refer to external resources, whether or not the command is the last command is checked in step S608. When it is not the last command, the process returns to step S601, and the next command is analyzed. When it is the final command, the processing is completed. If, in step S602, the command is found to be a command to refer to external resources, the translator 2 checks in step S603 whether or not the external resources have been already obtained. When it is found that the resources have been obtained, the translator 2 checks in step S608 whether or not the command is the last command. When the external resources have not been obtained, the translator 2 obtains the external resources in step S604, and checks in step S605 whether or not the external resources are printable. When the external resources are not in a printable format, the translator 2 deletes the resources in step S605, and updates the resource management table by setting Format Flag to "F" in step S606. If, in step S607, the external resources are printable, the translator 2 retains the external resources, updates the resource management table by setting Format Flag to "T" in step S606, and checks whether or not the command is the last command in step S608. In this example, the translator 2 performs processings to obtain external resources when the external resources have not been obtained. However, in such a case, the translator 2 may be set such that an output data processing for the external resources is not performed. In this case, the translator 2 may be set to ignore a processing to obtain the external resources in the series of processings a command to refer to external resources. Alternatively, the translator 2 may be set to detect meta data to be described below and perform an output data processing based on arrangements and settings of the meta data.

Next, referring to FIG. 7, a resource management table updating processing by the translator 2 is described. In addition to the processings described with reference to FIG. 6, the translator 2 performs a task to monitor a timer (not shown in the drawings) within the image processing apparatus to control the translator 2. Processings for the task are described below. In FIG. 7, the translator 2 checks in step S701 if it is time to update the external resources, and performs an external resource update processing (i.e., processings in step 702 and below in FIG. 7) if the set time interval has passed. The translator 2 refers to the entries in the resource management table in step S702, and checks the access frequency counters. When it is determined in step S703 that the frequency of accesses to any of the external resources is lower than an access frequency value that is set for determining whether or not they are to be deleted, the translator 2 deletes the relevant external resource in step S704, deletes entries corresponding to the deleted external resource from the resource management table in step S705, and checks in step S709 if the resource management table still contains entries. If the resource management table still contains entries, the translator 2 returns to step S702 and continues the succeeding processings. If no entry remains in the resource management table, the external resource update processing is completed. When it is determined in step S703 that the frequency of accesses to any of the external resources is higher than the access frequency value set for determination of deletion, the translator 2 proceeds to step S706. In step S706, the translator 2 judges whether or not the frequency of accesses to the relevant external resource is higher than an access frequency value that is set for determining whether or not they are to be updated. When the access frequency is determined to be higher than the set access frequency value, the translator 2 re-obtains the relevant external resource in step S707, and proceeds to step S708. When the access frequency is not determined to be higher in step S706, the translator 2 directly proceeds to step S708. In step 708, the access frequency counter corresponding to the relevant external resource in the resource management table is cleared. When the relevant external resource is updated, the time stamp of the external resource is also updated, and the translator 2 proceeds to step S709. In step S709, the translator 2 checks if any items still remain in the resource management table, and returns to step S702 and continues the succeeding processings when any items remain in the resource management table. When it is determined in step S709 that no item remains in the resource management table, the resource management table updating processing is completed.

FIG. 8 shows an example of an external resource with meta data. A portion (a) is processed as the meta data. A portion (b) is an actual resource data. The portion (a) describes information of the external resource, and the print system obtains and outputs this information.

Figure 9:
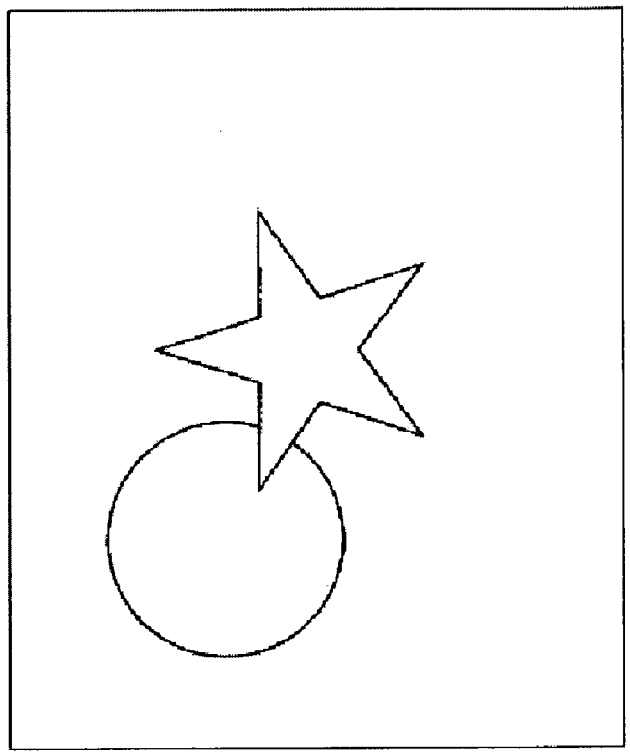
FIGS. 9(a) and 9(b) show examples of printing meta data together with external resources.
Figure 9:
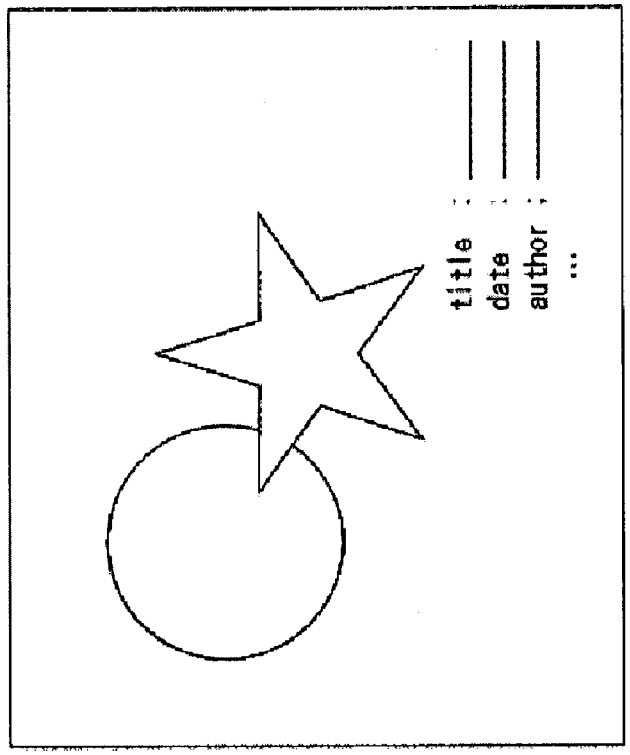

FIGS. 9(a) and 9(b) show examples of prints of an external resource with meta data. FIG. 9(a) shows an example of "Mixing" output in which the meta data is superposed on a position where the external resource is to be disposed and outputted. FIG. 9(b) shows an example of "Title" output in which the meta data is not disposed in a position where the external resource is to be disposed but outputted outside the external resource.

Figure 10:
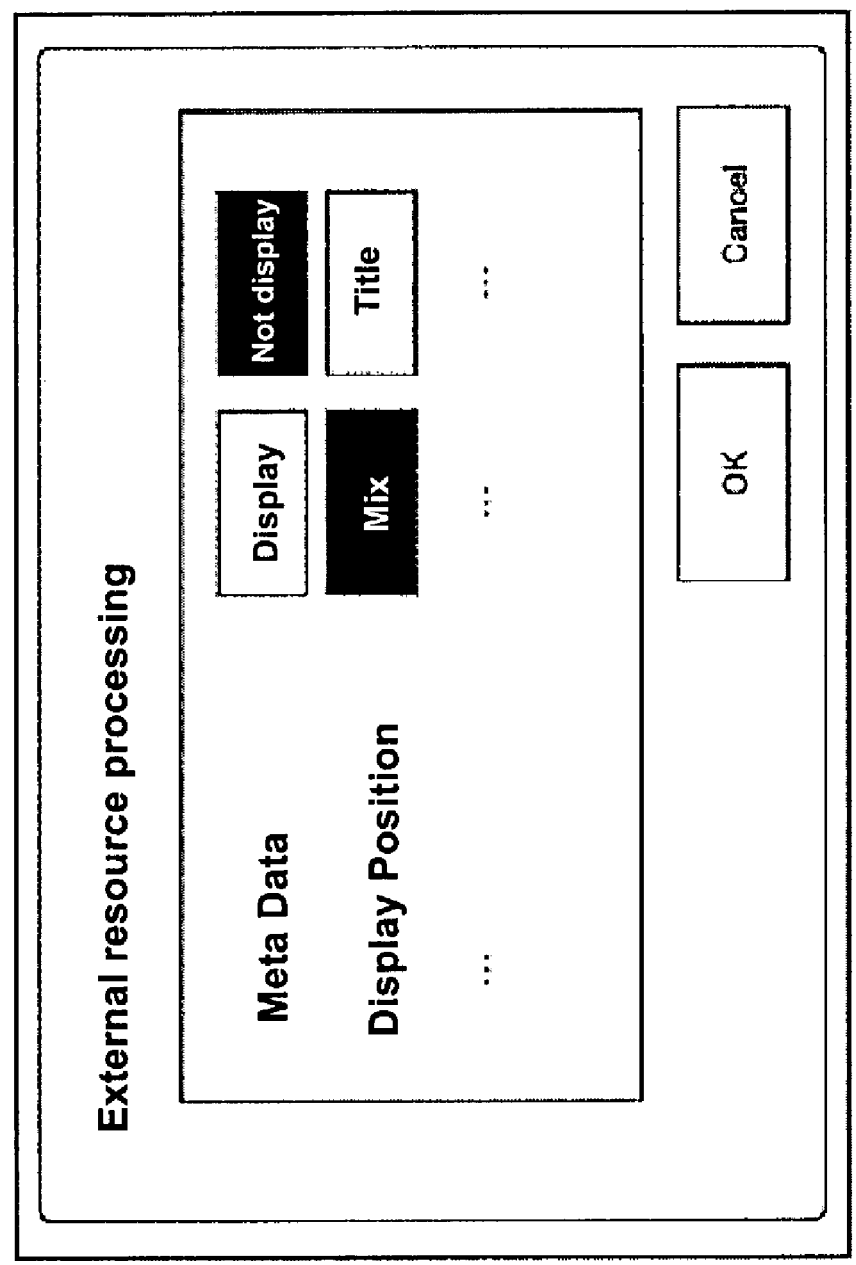
FIG. 10 shows an example of a screen image for setting a processing for meta data of external resource.

FIG. 10 shows an example of a screen image for setting a processing for meta data of an external resource. The setting screen image may be displayed in an operation panel of the image processing apparatus, or may be displayed on a monitor of the host computer 1 shown in FIG. 1. In other words, when the image processing apparatus is built in a printer, for example, software for print settings for a Web browser and display control software may be mounted on the printer. By this, an instruction not to print external resources may be inputted from the host computer that is connected to the printer through a network, such that the printer is set not to output external resources.

In FIG. 10, the screen image shows an item "Meta Data" for setting whether or not meta data is to be outputted, and an item "Display Position" for setting where meta data is to be displayed. Initial settings for these items may be "Not Display" for "Meta Data" and "Mix" for "Display Position". By setting the item "Meta Data" to "Display", meta data is printed together with an external resource. The item "Display Position" does not mean anything when the item "Meta Data" indicates "Not Display". When the item "Meta Data" indicates "Display", meta data is printed at a position that is set according to a value set at "Display Position". When meta data is not desired to be superposed on the external resource, the item "Display Position" is changed to "Title".

Here, the image processing apparatus may be set such that, when a setting is made to display meta data, the meta data is printed, and an external resource is not printed regardless of whether or not the external resource has been obtained.

Figure 11:
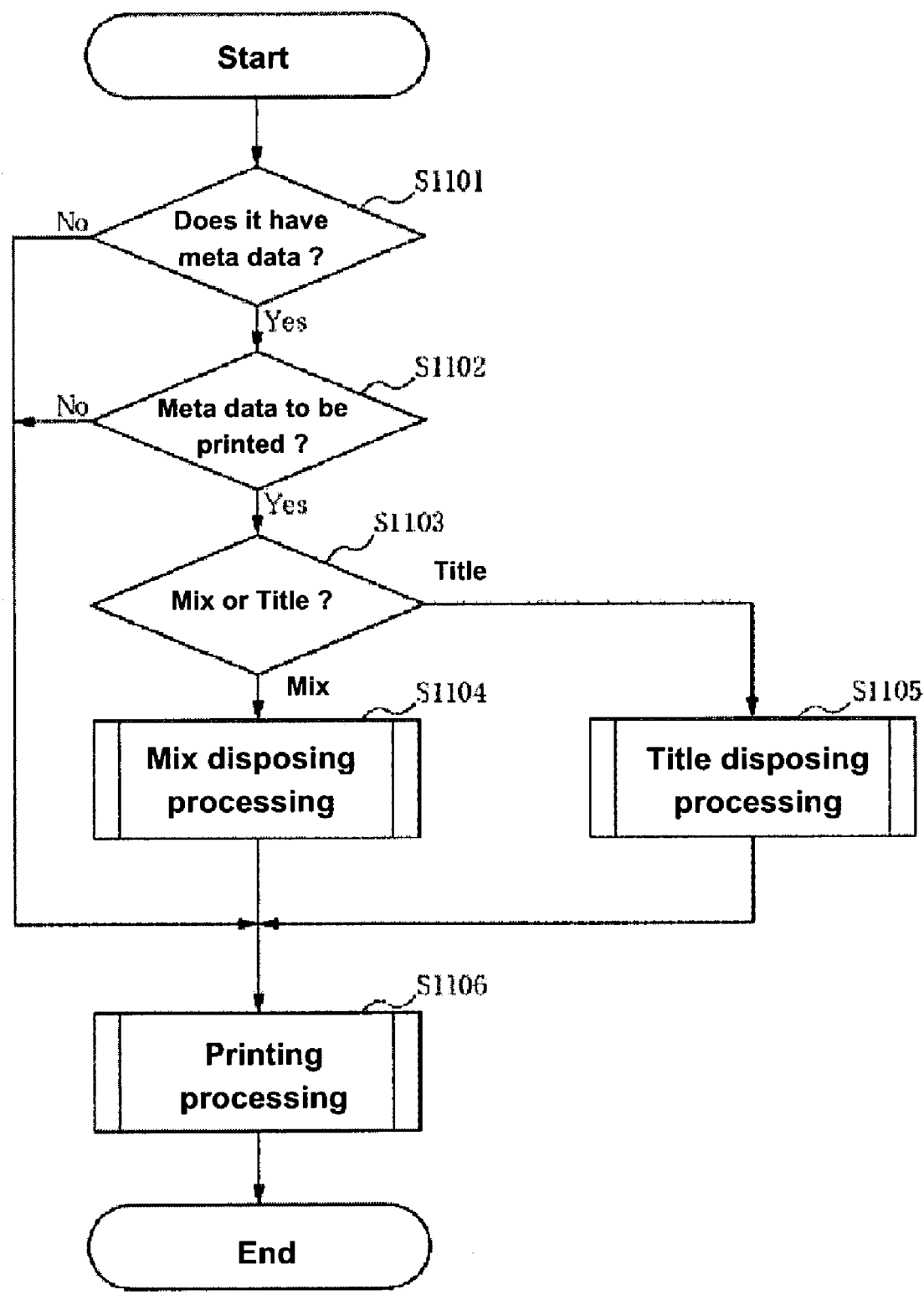
FIG. 11 shows an example of a meta data processing by a translator 2.

Next, the "external resource processing" that is performed in step S509 in FIG. 5 will be described in detail with reference to FIG. 11. FIG. 11 shows an example of a meta data processing by the translator 2. Referring to FIG. 11, the translator 2 checks in step S1101 if the external resource contains meta data. When no meta data is present, only the external resource is printed in step S1106, and the external resource processing is completed. When meta data is present, the translator 2 checks in step S1102 whether or not the meta data is to be printed. When the meta data is set not to be printed, only the relevant external resource is printed in step S1106 and the processing is completed. When the meta data is set to be printed, the setting of display position is checked in step S1103. When the display position is set as "Mix", the meta data is disposed at a position where it is superposed on the external resource, in step S1104. When the display position is set as "Title", the meta data is disposed outside the external resource, in step S1105. When the meta data has been disposed, the meta data is printed together with the external resource in step S1106, and the processing is completed.

Second Embodiment

In the first embodiment, regardless of whether or not a relevant external resource is in a printable format, a determination is made as to whether or not meta data is to be printed only according to a condition "if the relevant external resource has meta data" or "if meta data is to be printed". In the second embodiment, an output data processing is performed through making a determination as to whether or not an external resource is to be processed according to a setting as to whether or not the external resource is to be outputted. Furthermore, the second embodiment proposes a processing that is performed when an external resource has meta data, but the external resource is in a format that cannot be processed. In this case, the meta data may be printed depending of the requirements in accordance with the second embodiment. Ordinarily, when an external resource is in a format with which the external resource can be converted into output data, meta data may not be printed. However, in the second embodiment, when an external resource cannot be processed, meta data can be printed. In the following example, only differences from the first embodiment are described.

Figure 12:
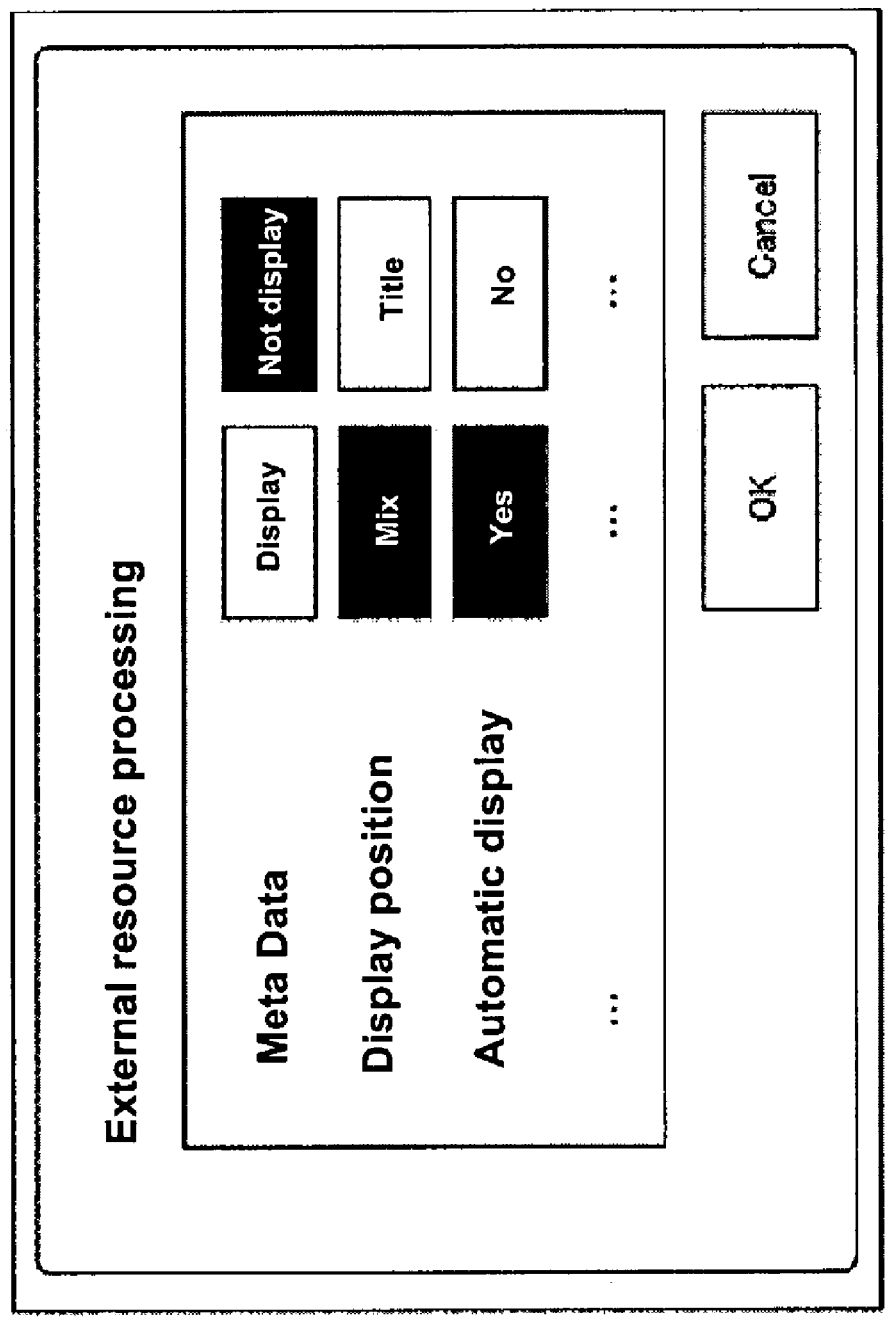
FIG. 12 shows an example of a screen image for setting a processing for meta data of external resource.

FIG. 12 shows an example of a screen image for setting a processing for meta data of an external resource. The screen image shows an item "Meta Data" for setting whether or not meta data is to be outputted, an item "Display Position" for setting where meta data is to be displayed, and an item "Automatic Display" for setting whether or not meta data is to be outputted when a format of the relevant external resource cannot be processed. Initial settings for these items may be "Not Display" for "Meta Data", "Mix" for "Display Position", and "Yes" for "Automatic Display". By setting the item "Meta Data" to "Display", meta data is printed together with the external resource. The item "Display Position" does not mean anything when the item "Meta Data" indicates "Not Display". When the item "Meta Data" indicates "Display", meta data is printed at a position that is set according to a value set at "Display Position". When meta data is not desired to be superposed on the external resource, the item "Display Position" is changed to "Title".

When the item "Automatic Display" is set at "Yes", meta data is outputted regardless of a setting value at the item "Meta Data" when the external resource is in a format that cannot be processed. When the item "Automatic Display" is set at "No", the inputted document data is analyzed and output data is generated without processing the format of the external resource. When bit map data is generated as output data, a data processing is performed based on document data inputted in the image processing apparatus. In this instance, for example, a processing such as painting a figure to be placed at the location where the external resource is to be disposed with a predetermined single color may be performed. When the item "Meta Data" is set at "Display", meta data is outputted after being disposed inside an area where the external resource is to be disposed, or adjacent to such an area, regardless of a set value at the item "Automatic Display".

Meta data may preferably be displayed in an upper portion or a lower portion of a frame where the external resource is disposed according to a setting provided in the document data, or a setting inputted by the user in the image processing apparatus.

When the item "Automatic Display" is set at "No", it is possible to control such that the translator 2 does not obtain external resources. By this, wastes in the network traffic can be suppressed.

Figure 13:
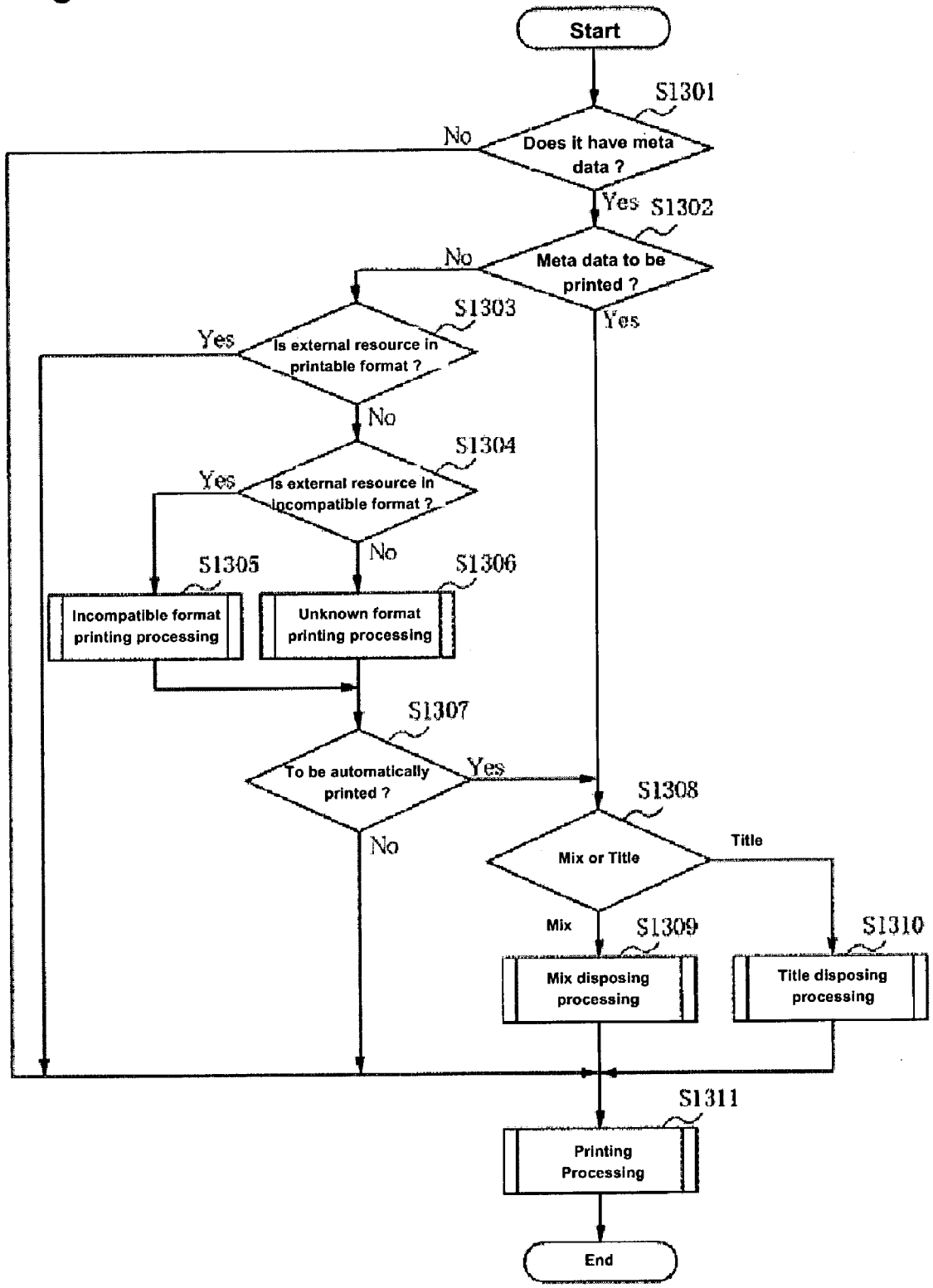
FIG. 13 shows in detail a processing in step S509 indicated in FIG. 5 in accordance with a second embodiment of the present invention.

FIG. 13 shows the detail in accordance with the second embodiment of the "external resource processing" that is performed in step S509 in FIG. 5. FIG. 13 shows a flow chart of an example of a meta data processing. Referring to FIG. 13, whether or not a relevant external resource has meta data is checked in step S1301. When no meta data is present, only the external resource is printed in step S1311 and the external resource processing is completed. When meta data is present, whether or not the meta data is to be printed is checked in step S1302. When the meta data is set not to be printed, whether or not the relevant external resource is in a printable format is checked in succession in step S1303 by using a header or the like of the external resource. When the external resource is in a printable format, only the relevant external resource is processed for output in step S1311, and the processing is completed. When the relevant external resource is not in a format that is printable, whether the kind of the format, although the format of the external resource cannot be printed, has been confirmed is checked in step S1304. If the format of the external resource has been confirmed, a printing that indicates that the format is one of incompatible formats, as determined in step S1305, (for example, a printing of a rectangle having a different color corresponding to each of the different incompatible formats) is performed, and then a setting value indicating whether meta data is to be automatically printed is checked in step S1307. Also, when the format of the external resource is not confirmed in step S1304, a printing that indicates that the format is an unknown format, as determined in step S1306, (for example, a printing of a rectangle indicating an unknown format) is performed, and then a setting value indicating whether meta data is to be automatically printed is checked in step S1307. When it is determined in step 51307 that the meta data is set not to be automatically printed, only the external resource is processed for data output in step S1311.

Here, it is determined that the external resource is not printable, in other words, it is determined that the external resource is in an incompatible format or a unknown format, the resource management table may be updated and then the obtained external resource may be deleted. As a result, the storage region can be more effectively utilized. When it is found in step S1302 that meta data is set to be printed, or when it is found in step S1307 that meta data is set to be automatically printed, a setting of display position is checked in step S1308. When the display position is set as "Mix", in step S1309, meta data is disposed at a position where the meta data is superposed on the relevant external resource. When the display position is set as "Title", meta data is disposed outside the relevant external resource in step S1310. For example, a mixing processing is performed as follows. Document data that has been inputted in the image processing apparatus without being processed by using external resource data is processed into bitmap data. In this instance, the bitmap data is created such that a figure to be placed at the position where external resource data is to be disposed is automatically painted in a predetermined single color, for example, white. Next, bitmap data is created from an image that is obtained by processing the meta data by enlarging or reducing the image to be placed inside a contour of the external resource. Lastly, the data obtained by processing the external resource is written over the area that has been painted in white where the external resource is to be disposed as described by the meta data, and the obtained bitmap data is mixed. For example, after the meta data is disposed in place, the external resource is printed with the meta data in step S1311, and the processing is completed. As described above, in accordance with the present embodiment, a determination is made as to whether the format of an external resource can be processed by the image processing apparatus, and an output processing is performed without using the external resource when the format thereof cannot be processed. Accordingly, at least information contained in document data can be securely outputted.

In the embodiment described above, settings for outputting meta data may be made at an operation panel mounted on the image processing apparatus. However, such settings may be made at a host computer that is connected to the image processing apparatus through a network.

Third Embodiment

In accordance with a third embodiment of the present invention, printing processings may be performed without obtaining external resources, and printing processings may be performed without using external resources upon failure to obtain external resources.

A dialogue that allows a setting to choose whether or not external resources are processed is prepared. When a setting is made so as not to perform a print data processing for external resources, the translator 2 is controlled so as not to obtain external resources. In this case, the translator 1 leaves a space where an external resource is to be disposed as blank regardless of the state of the resource management table, performs an output data processing and generates image data.

When the translator 2 attempts to obtain external resources based on a command to refer to the external resources, it may fail to obtain the external resources. In this case, in one embodiment, a note indicating that the external resources cannot be obtained may be written in the resource management table (not shown in the drawings). In the present embodiment, when a command to include external resources is execute, the translator 2 confirms entries in the resource management table that record whether or not the external resources to be referred to can be obtained. When there are entries in the resource management table that record the external resources to be referred to can be obtained, the translator 2 obtains the external resources through a network. On the other hand, when there are any entries in the resource management table that record failures to obtain the external resources to be referred to, the translator 2 may be controlled so as not to attempt to obtain the relevant external resources again unless a predetermine time has elapsed since the time of failures to obtain the external resources. When the translator 1 reads from the resource management table the entries indicating that the relevant external resources cannot be obtained, the translator 1 paints an area where the external resources are to be disposed with a predetermined single color, performs an output data processing, and forms image data. It goes without saying that, like the embodiments described above, information concerning the external resources such as meta data of the external resources can be utilized, a printing processing can be performed, using the meta data.

Furthermore, extensions of external resources may be used to assume data formats of the external resources. For example, the following method may be adopted. Extensions for data formats that can be data-processed for printing may be stored in advance in the image processing apparatus. When the extension of an external resource does not match with any of the stored extensions, the translator 2 may assume that such an external resource is not printable, and may not perform a processing to obtain the relevant external resource.

The translator 1 may paint an area where the external resource is to be disposed with a predetermined color, and performs a printing processing. In this instance, file names and information of locations of external resources on a network, for example, URIs, may be used as information concerning the external resources.

Other Embodiments

The processings described with reference to the accompanying drawings in accordance with the embodiments described above are performed by users' image processing apparatuses or a host computer (not shown in the drawings) that is connected to such image processing apparatuses according to programs that may be installed externally. In such cases, the present invention is applicable to cases where groups of information containing the programs may be supplied to the host computer from storage media, such as, for example, a CD-ROM, flash memory, floppy disk and the like or, through a network from external storage media.

The present invention can be achieved by having a storage medium that stores program codes of software that realize the functions of the embodiments described above supplied to a system or an apparatus, or such program codes of software downloaded from a host computer (not shown in the drawings), and by having a computer (or a CPU or an MPU) of the system or the apparatus read and execute the program codes stored in the storage medium.

In this case, the program codes themselves that are read from the storage medium realize the functions of the embodiment of the present invention, and the storage medium that stores the program codes constitute the present invention. The storage medium to supply the program codes may be, for example, a floppy disk, a hard disk, an optical disk, an optical magnetic disk, a DVD, a CD-ROM, a magnetic tape, a nonvolatile memory card, a ROM, or an EEPROM.

Furthermore, the present invention is applicable not only when the program codes read by a computer are executed to realize the functions of the embodiments, but also when an operating system that operates on the computer performs a part or all of the actual processing based on the instructions contained in the program codes and thereby realizes the functions of the embodiments.

Moreover, the present invention is also applicable when the program codes that are read from the storage medium are written on a memory of an expansion board inserted into a computer or of an expansion unit connected to a computer, and a CPU provided on the expansion board or on the expansion unit performs a part or all of the actual processing based on the instructions contained in the program codes and thereby realizes the functions of the embodiments.

As described above, in the image processing apparatus in accordance with one embodiment of the present invention, a print data processing for external resources can be set to be unnecessary. As a result, when a printing processing for external resources is performed, the image processing apparatus can restrict data outputs of external resources as such outputs are known in advance to be unnecessary. Accordingly, the network traffic and storage region can be more effectively utilized. Moreover, when it fails to obtain external resources, such external resources are prevented from being obtained again, such that generation of wastes in the network traffic can be suppressed, and the output processing can be performed at higher speeds. Furthermore, even when an output data processing for external resources cannot be performed, information concerning the external resources can be placed on a screen and printed based on a user's instruction by an image processing apparatus that processes documents containing commands to refer to external resources. Accordingly, the information concerning the external resources can be recorded on printing media, such that an image processing that can retain such information in the form having the value as documents can be provided. Further, data output processings for data including external resource data can be properly performed, such that the outputs can maintain the value of the original data.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An image processing apparatus that performs an output processing based on document data including a command to refer to an external resource, the document data being received from a host computer, the image processing apparatus comprising:
   an output data processing unit that reads document data from a storage device and performs an output data processing;
   a detection unit that detects the command to refer to the external resource and text information related to the external resource in the document data read by the output data processing unit;
   an external resource obtaining unit that obtains the external resource using the command detected by the detection unit; and
   an input unit that inputs an instruction indicating whether or not the text information detected by the detection unit is to be output,
   wherein the output data processing unit outputs the external resource obtained by the external resource obtaining unit and the text information detected by the detection unit when the instruction input by the input unit indicates that the text information is to be output, and outputs the obtained external resource without the detected text information when the input instruction indicates that the text information is not to be output;
   wherein the input unit inputs the instruction indicating whether or not the text information detected by the detection unit is to be outputted, and further inputs a second instruction if the external resource obtained by the external resource obtaining unit in response to input of the instruction has a format which is not supported by the image processing apparatus, the second instruction indicating whether or not the text information related to the non-supported external resource is to be output;
   wherein the output data processing unit outputs the external resource without the text information when the input instruction indicates that the text formation is not to be output and when the obtained external resource is not the non-supported external resource, and
   wherein the output data processing unit determines, in accordance with the second instruction, whether or not the text information is to be output when the input instruction indicates that the text information is not to be output and when the obtained external resource is the non-supported external resource.

2. An image processing apparatus according to claim 1, further comprising a print processing setting unit that makes a setting whether or not the external resource is to be output.

3. An image processing apparatus according to claim 2, wherein the print processing setting unit makes a setting not to output external resources by an input of a setting not to output external resources provided from a host computer that is connected to the image processing apparatus through a network.

4. An image processing apparatus according to claim 3, wherein, when the print processing setting unit makes a setting not to output based on external resources, the output data processing unit mixes data obtained by processing the inputted document data without using external resources and information concerning the external resources to generate output data.

5. An image processing apparatus according to claim 2, wherein, when the print processing setting unit makes a setting not to output based on external resources, the external resource obtaining unit does not obtain external resources.

6. An image processing apparatus according to claim 2, wherein the external resources obtained by the external resource obtaining unit through the network are image data.

7. An image processing apparatus according to claim 2, wherein the output data processing unit successively reads commands contained in document data that are obtained through the network and analyzes whether or not the commands are to process external resources.

8. An image processing apparatus according to claim 2, wherein the output data processing unit successively reads commands described in Extensible Markup Language.

9. An image processing apparatus according to claim 2, wherein, when the output data processing unit mixes data obtained by processing the inputted document data without using the external resource and data obtained from information concerning the external resource to generate output data, the output data processing unit generates the output data such that data obtained from information concerning the external resource processed by the external resource obtaining unit is disposed at an upper section or a lower section of an image of the output data.

10. An image processing apparatus according to claim 2, wherein, when the output data processing unit mixes data obtained by processing the inputted document data without using the external resource and data obtained from information concerning the external resource to generate output data, the output data processing unit generates the output data such that an image formed from the information concerning the external resource is disposed inside or adjacent to an area where the external resource is to be disposed within an image that is generated by processing the inputted document data without using the external resource.

11. An image processing apparatus according to claim 4, wherein the information concerning the external resource is information for describing the external resource which is embedded in the document data.

12. An image processing apparatus according to claim 4, wherein the information concerning the external resource included in the document data that is obtained by the image processing apparatus through the network is information indicating at least one of a file name of the external resource and a location of the external resource on the network.

13. An image processing method for an image processing apparatus that performs an output processing based on document data including a command to refer to an external resource, the document data being received from a host computer, the image processing method comprising:

an output data processing step that reads document data from a storage device and performs an output data processing;

a detection step that detects the command to refer to the external resource and text information related to the external resource in the document data read by the output data processing step;

an external resource obtaining step that obtains the external resource using the command detected by the detection step; and an input step that inputs an instruction indicating whether or not the text information detected by the detection step is to be output, wherein the output data processing step outputs the external resource obtained by the external resource obtaining step and the text information detected by the detection step when the instruction input by the input step indicates that the text information is to be output, and outputs the obtained external resource without the detected text information when the input instruction indicates that the text information is not to be output;

wherein the input step inputs the instruction indicating whether or not the text information detected by the detection step is to be outputted, and further inputs a second instruction if the external resource obtained by the external resource obtaining step in response to input of the instruction has a format which is not supported by the image processing apparatus, the second instruction indicating whether or not the text information related to the non-supported external resource is to be output, wherein the output data processing step outputs the external resource without the text information when the input instruction indicates that the text formation is not to be output and when the obtained external resource is not the non-supported external resource, and wherein the output data processing step determines, in accordance with the second instruction, whether or not the text information is to be output when the input instruction indicates that the text information is not to be output and when the obtained external resource is the non-supported external resource.

* * * * *

UNITED STATES PATENT AND TRADEMARK OFFICE
CERTIFICATE OF CORRECTION

PATENT NO. : 7,365,866 B2
APPLICATION NO. : 10/421144
DATED : April 29, 2008
INVENTOR(S) : Hiroyoshi Takamiya It is certified that error appears in the above-identified patent and that said Letters Patent is hereby corrected as shown below:

COLUMN 1:

Line 23, "in" should read --on--.

COLUMN 5:

Line 15, "metal" should read --meta--.

COLUMN 6:

Line 7, "delete" should read --deletes--; and
Line 35, "in" should be deleted.

COLUMN 7:

Line 55, "step 702" should read --step S702--.

COLUMN 8:

Line 7, "5706" should read --S706--; and
Line 16, "step 708," should read --step S708,--.

COLUMN 9:

Line 41, "of" should read --on--.

UNITED STATES PATENT AND TRADEMARK OFFICE
CERTIFICATE OF CORRECTION

PATENT NO. : 7,365,866 B2
APPLICATION NO. : 10/421144
DATED : April 29, 2008
INVENTOR(S) : Hiroyoshi Takamiya It is certified that error appears in the above-identified patent and that said Letters Patent is hereby corrected as shown below:

<u>COLUMN 10</u>:

Line 60, "51307" should read --S1307--.

<u>COLUMN 11</u>:

Line 63, "execute" should read --executed--.

<u>COLUMN 12</u>:

Line 6, "predetermine" should read --predetermined--.

Signed and Sealed this

Thirtieth Day of September, 2008

JON W. DUDAS
*Director of the United States Patent and Trademark Office*